United States Patent [19]

Anderson et al.

[11] Patent Number: 5,145,217
[45] Date of Patent: Sep. 8, 1992

[54] UNIVERSAL DRYER DUCT AND VENT

[75] Inventors: Charles B. Anderson, Jacksonville, Tex.; Charles R. Kenrick, Spring Lake, Mich.

[73] Assignee: Builder's Pride, Inc., Jacksonville, Tex.

[21] Appl. No.: 621,774

[22] Filed: Dec. 4, 1990

[51] Int. Cl.⁵ .............................................. F16L 27/00
[52] U.S. Cl. .................................... 285/179; 285/181; 285/182; 285/183; 285/163; 285/168; 285/424; 285/903
[58] Field of Search ............... 285/181, 183, 163, 165, 285/424, 182, 164, 168, 903, 226; 98/DIG. 7

[56] References Cited

U.S. PATENT DOCUMENTS

| | | | |
|---|---|---|---|
| 1,243,438 | 10/1917 | Morris | 285/181 |
| 1,288,335 | 12/1918 | Whitmore | 285/182 |
| 1,661,674 | 7/1925 | Osborn | 285/424 |
| 2,086,007 | 3/1936 | Tompkins | 285/183 |
| 2,348,455 | 9/1941 | Daudelin | 98/DIG. 7 |
| 2,823,703 | 2/1958 | Nusser | 285/181 |
| 3,185,506 | 8/1963 | Szlashta | 285/183 |
| 5,042,844 | 8/1991 | Iida et al. | 285/903 X |

Primary Examiner—Randolph A. Reese
Assistant Examiner—Timothy Aberle
Attorney, Agent, or Firm—Price, Heneveld, Cooper, DeWitt & Litton

[57] ABSTRACT

A dryer duct assembly employs two universal elbow components and at least one flexible component. The flexible component has ends capable of connecting to another flexible component or to a universal component without the use of other devices such as hose clamps to secure connection. Each elbow has ends capable of attaching either to the wall opening or the dryer, in addition to attaching to the flexible component in the same manner as the flexible components may attach to each other. The elbow has an outer portion resembling the outer portion of a quarter-toroid, and a square type inner portion. The outer portion is made of a pair of mirror image hemi portions connected at adjacent flanges. The inner portion has an L-shaped plate with flow-through orifices in each leg of the L.

6 Claims, 3 Drawing Sheets

UNIVERSAL DRYER DUCT AND VENT

RELATED APPLICATIONS

This application is related to the copending applications Ser. No. 07/621,757, filed Dec. 4, 1990, entitled DRYER DUCT AND VENT ASSEMBLY, Ser. No. 07/621,756, filed Dec. 4, 1990, entitled UNIVERSAL DUCT ELBOW AND CONNECTOR PLATE, and Ser. No. 07/621,775, filed Dec. 4, 1990, entitled SOFT CUFF CORRUGATED DUCT.

BACKGROUND OF THE INVENTION

This invention relates to exhaust vent systems for clothes dryers.

Dryer exhaust conduits conduct substantial quantities of heated air and lint from the dryer to an external location. Because of the amount of thermal energy involved in the vented air and in the dryer itself, dryer hose installation should be carefully made by a skilled serviceman. A kinked or crushed conduit could create highly undesirable air flow restriction causing reduced velocity resulting in lint buildup in locations of reduced velocity. This lint buildup constitutes combustible material in the event of a fire in the dryer.

Underwriters Laboratory, being well aware of these problems, will not allow the UL listing for any dryer unless the manufacturer uses all metal connections and conduit in the vent system in order to contain any fire within the dryer and vent system. Unfortunately, the persons that frequently install dryers are delivery people hired by retailers to drive truck and unload equipment. They too often are without the metal working skills required to make an effective dryer exhaust hookup of metal components. Therefore, such delivery people largely refuse and/or are simply unable to use metal duct and connectors as required by UL, because such are too complex for their skill level. Yet, they are commonly required by their employers to install the dryer vent system. Consequently, they use whatever materials are easy to manipulate, usually accordion type vinyl duct, and connect them any way they can. The results are far from ideal. Vinyl duct tends to collect lint along its length if kinked. Moreover, vinyl duct is not noncombustible. Hence, if a fire should occur in the dryer, it cannot be contained by the vent hose. The Consumer Products Safety Commission reported that in 1987, 13,900 clothes dryer fires occurred in the U.S.

Another difficulty in installing clothes dryer vent systems is the limited space available to do the work. Dryers typically are fitted into a space just wide enough to receive them, i.e., straddled by walls, a washing machine, a cabinet, or shelving. Typically, therefore, it is practically impossible to make the vent connection after the dryer is against the wall. By making the connection when the dryer is still spaced several feet from the wall too often results in not being able to get the dryer close to the wall after the installation or, if it is pushed close to the wall, the hose sometimes gets crushed, kinked and/or flattened, resulting in poor air flow.

Dryer manufacturers are therefore concerned about poor dryer performance from an improper installation, as well as about potential legal liability in the event of overheating caused by a poor vent arrangement, and failure of the dryer safety controls to shut down the dryer before ignition temperature is achieved. The manufacturer can supply metal connector and duct material to the retailer with the dryer and stipulate that only metal duct components are to be used, but when the delivery person takes the dryer from the retailer to the purchaser, the manufacturer has no effective way of forcing him to install the dryer conduit using metal ducts and connectors.

The problem has been further compounded in recent years due to a tendency to place dryers in small closets. Typically such a closet will have a maximum of about 33 inches clearance. There is little or no room to make the vent hookup unless the dryer is outside of the closet at the time. Then, when it is pushed into the closet, several things, some bad, can happen to the dryer hose and connection.

Hence, in spite of the initial efficiency of the dryer as manufactured, and the theoretical connection to a freely flowing exhaust, in practice dryers may well not achieve this type of efficiency, and moreover the dryer and/or the vent duct are susceptible to overheating because of inadequate air flow through the vent system, failure of safety circuits, and collection of combustible lint.

SUMMARY OF THE INVENTION

An object of this invention is to provide a dryer ventilation duct system that enables a workman to complete the duct hookup simply by leaning over the dryer after it is adjacent the wall and sliding a pair of components together. The system enables the dryer to be positioned closely adjacent the wall, e.g., three or four inches therefrom, yet without the duct being kinked, squashed or crushed. Tests have shown excellent air flow with the arrangement.

Another object of the invention is to provide a dryer ventilation system using all metal duct and connectors, so as to meet UL listing requirements of the dryer, yet being simple and readily connected with relatively little skill required. Delivery people with low levels of skill can connect it quickly and easily, achieving excellent flow characteristics and safe operation.

Another object of this invention is to provide a dryer ventilation system capable of enabling the dryer to be positioned directly adjacent and in front of the outlet opening in the wall where the hot air is vented, or just as readily to be several feet laterally of the wall outlet, using the same duct arrangement and connectors. The metal duct can be looped for the first type arrangement, or extended laterally for the second type arrangement. Connection is just as simple in either instance.

The connector subassemblies each have a special elbow connector having one end attached to the respective duct element with a rotary, i.e., swivel, connection and having the second end attachable to the dryer or the wall outlet. This second end also has a rotary joint. The duct is corrugated to enable it to be flexibly configurated and/or elongated as desired. The rotary connections plus the flexibility enable the duct to accommodate a variety of orientations. The swivel arrangement also enables the duct, which is torsionally rigid, to be shifted with movement of the dryer without disassembly of the vent assembly. Yet this is done without kinking the duct, twisting the fittings or causing stress that could damage the elbows or attaching hardware. The opposite ends of the duct elements have interconnectable elements for a direct fit such as a sliding telescopic interfit.

The elbow connectors are of universal nature, normally having a female rotatable fitting on one end and a male rotatable fitting on the other end. Each end has resilient snap type retainers to hold the connections together, once made. Also, the ends are longitudinally slotted for effective clamping thereof onto a duct fitting. Each elbow can have two male connectors or two female connectors, if desired. An elbow can be connected to a duct, to a dryer, to an exhaust pipe, or even to another elbow.

The duct assembly can be formed in a selected length and a selected number of turns by using two universal components, one being a flexible duct component and the other being an elbow component. The flexible duct component has ends capable of connecting to another like flexible duct component, or to the elbow component, without the use of other securing devices, e.g., peripheral clamps. The elbow component is capable of attachment to the flexible duct component without other securing devices, and to a dryer outlet or a wall outlet.

These and other objects, advantages and features of the invention will become apparent from the following detailed description in conjunction with the drawings.

DESCRIPTION OF THE PREFERRED EMBODIMENT

Referring now specifically to the drawings, an assembly 110 is there shown, such including a fragmentary portion of a conventional dryer subassembly 12 and a wall 18, with a dryer duct assembly 114 extending therebetween. Each elbow has each end rotatable on the axis thereof, the elbow body being formed of simple metal components. Snap connectors are provided between the male and female telescopically interfit connector sleeves, eliminating the need for other fasteners such a ring clamps.

Figure 1:
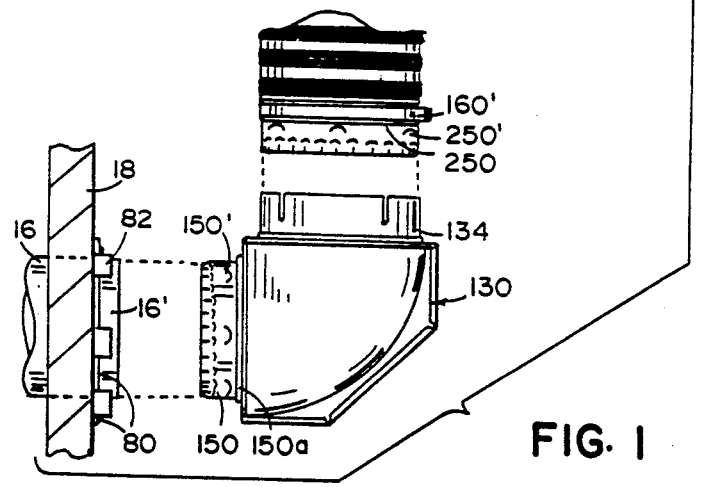
FIG. 1 is a side elevational view showing a the invention.
Figure 4:
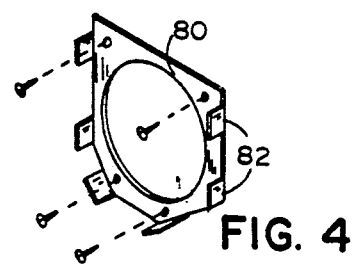
FIG. 4 is a perspective view of an attachment plate useable to secure the duct assembly to the wall.

When using this invention, there may be two duct subassemblies, one of which is connected to the dryer and the other of which is connected to the wall outlet pipe. Later, these two are interconnected to each other by a workman leaning over the dryer after it is put in place. Sometimes, however, it is desirable to employ only one section of flexible duct if, e.g., there is plenty of space around the dryer to do that. In FIG. 1 is depicted duct 20 between two elbow connectors 130. Hence, duct 20 could be of two separate duct sections interconnected at one end of each with the other duct section not specifically shown. Therefore, this invention should not be considered limited to just one duct section, or any particular number of sections, except as set forth in the claims hereof.

The dryer includes a conventional cylindrical outlet duct stub 15, typically of a male type, sometimes crimped around its periphery so as to decrease its diameter sufficiently to readily fit within the outer diameter of a female connector element. In wall 18 is outlet conduit 16 which has a portion 16' which projects through the wall and typically has a female type receiver to receive a male type fitting of the duct assembly.

Figure 2:
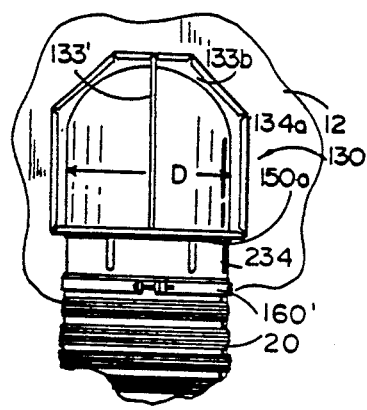
FIG. 2 is an end elevational view of the upper portion of the assembly in FIG. 1.

This assembly employs unique elbow connector components and a flexible duct component, which are universal in nature; that is, the elbow connectors can attach to the dryer, to the wall outlet, to the flexible duct, and/or to each other, while the flexible duct can attach to the elbow connectors and/or to another like flexible duct. This is without the use of added devices such as hose clamps, except sometimes at the dryer and the wall outlet. Each of the elbow connectors 130 preferably has a female sleeve 134 on one end and a male sleeve 150 on the other end, these two being shown at an angle to each other of approximately 90°, and communicating with each other through a smoothly curved hollow space within body 131 of connector elbow 130. Smooth air flow is facilitated by having the outer 180° of the elbow surface comparable to the surface of a quarter toroid, forming a curvilinear surface semicircular in cross section. As is known, air flow around a bend tends to be more dense toward the outside of the elbow, such that the outer surface has a major effect on the flow characteristics. The inner 180° of the elbow surface is of square configuration. The elbow is of unique overall configuration. Moreover, it has a remarkably small centerline bend radius of less than about 0.6 diameter. That is, the length of the radius from the centerline C/L of the elbow (FIG. 1) to the radial center C for the elbow is actually less than about 0.6 of the elbow conduit diameter D (FIG. 2). Conventional elbows have a centerline radius of at least 1 diameter. The novel close tolerance elbow enables it and connected duct to fit within a space of about three-fourths inch or less greater than the duct diameter, e.g., a four inch duct can be fit with its elbows in a space of about four and three-fourths inch depth or less between the dryer and the wall. This is remarkably close. Yet, the air flow is excellent. Moreover, each of the sleeves is rotatable relative to the connector subassembly for ease in orientation of the components for interconnection of the duct subassemblies with each other and with the dryer and wall outlet at various angular arrangements and distances.

The conventional male connector 15 on dryer 12 may or may not be crimped in the manner shown.

Female sleeve 134 has a series of peripherally spaced, axially extending slots 135 which enable slight enlargement or contraction of this sleeve, the enlargement enabling easy interconnection sliding fit by receiving standard male connector 15, and being radially contractible by optional clamp 160 when tightened down onto sleeve 134. The female sleeve 134 is rotatable about its axis, i.e., swivelable, relative to the main body of elbow connector 130, because of the interfit therebetween, as described more fully hereinafter. The male sleeve 150 on the other end of connector 130 is peripherally crimped in like fashion to the typical male connector 15 on the dryer so as to reduce its diameter sufficiently to fit within a cooperative female sleeve 234 in one end of the flexible duct 20. This male sleeve is also rotationally attached to the body of elbow connector 130 so as to be rotatable about its central axis, as explained more fully hereinafter. At the inner end of, and around the outer periphery of each sleeve of each elbow connector is a flange transverse to the sleeve axis, e.g., flanges 134a and 150a on upper connector 130.

Between the crimped portion of sleeve 150 and its connection to the elbow body is a series of flexible semicircular or arcuate tabs 150' which protrude diagonally and radially outwardly from the housing on a small acute angle away from the open end of the connector, for abutment interconnection with an inturned end flange inside female sleeve 234. That is, the outer end of sleeve 234 is turned radially and axially inwardly, and pressed flat against the inner periphery of the sleeve to form an inner annular flange oriented axially inwardly of the sleeve. Therefore, its inner edge forms a stop surface of the type depicted in FIG. 7, to engage and secure the outwardly divergent protrusions 150' and lock the female collar or sleeve onto the male collar or sleeve when slidably interconnected, as explained in more detail hereinafter. Each elbow connector female sleeve, e.g., sleeve 134, also has the outer end turned radially and axially inwardly, flat against the inner periphery of the sleeve, so that its inner edge forms a stop of the same nature as depicted in FIG. 7.

Figure 7:
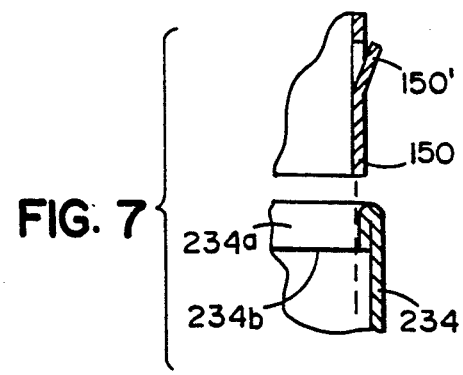
FIG. 7 is an enlarged, fragmentary view of the snap fit components of male and female sleeves to be interfitted.
Figure 9:
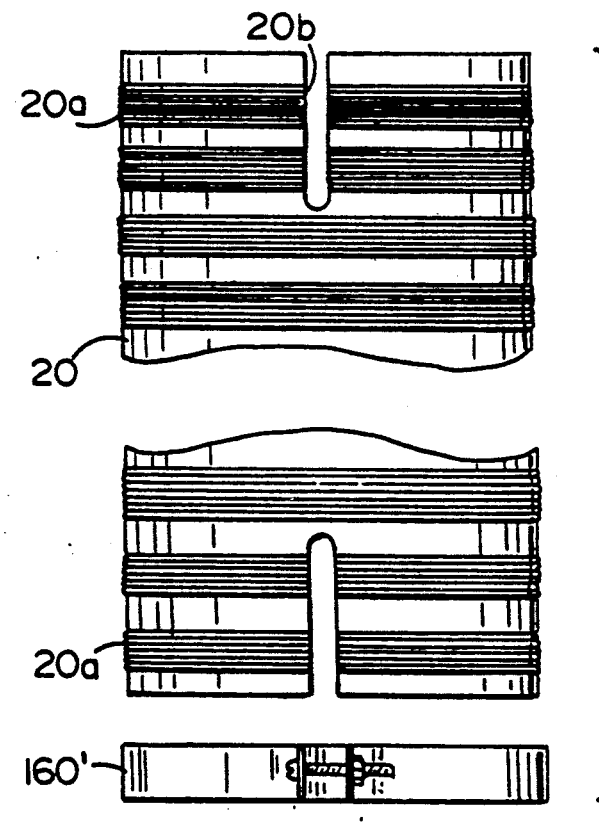
FIG. 9 is a fragmentary elevational view of a duct showing soft cuffs on the ends thereof.

Referring more specifically to FIG. 7, this female sleeve 234 has the inwardly turned end flange 234a to form a peripheral edge 234b inside the sleeve. On male connector 150 is the radially outwardly protruding set of resilient tabs 150' extending at a small acute angle to the male sleeve and here shown to have ends which are arcuate in shape. Hence, when the slightly smaller diameter male sleeve 150 is inserted into female sleeve 234, these tabs 150' will be temporarily deflected radially inwardly and then snap back by their inherent resilience radially outwardly behind edge 234b of flange 234a, to prevent withdrawal of the male member. This interconnection makes it unnecessary to employ a conventional clamp ring. The axially extending slots 235 in sleeve 234 enable the female sleeve 234 to readily expand, if necessary to fit with male sleeves not containing tabs 150'. The opposite end of female sleeve 234 extends within the adjacent end of flexible conduit 20, and is secured in place as by a peripheral clamp 160, as depicted in FIG. 1. Flexible corrugated duct 20 is of metal, preferably aluminum, formed by conventional techniques to have many annular peripheral corrugations so as to be axially extendible, contractible and/or laterally flexible to accommodate the particular orientation and length necessary. Each end of the corrugated duct is specially worked to create a soft cuff 20a (FIG. 9) thereat. More specifically, a portion at each end of the duct is rolled, or preferably die compressed with radial dies, to compress the corrugations to a generally cylindrical condition of a diameter, both inner and outer, substantially the same as the inner diameter of the remainder of the duct. These compressed end portions are longitudinally slit to form at least one, and preferably at least two, longitudinal, i.e., axial, slots 20b. Hence, these compressed slit portions form cuffs which can be radially contracted to a smaller diameter by an adjustable peripheral clamp 160' for compressing the cuffs onto the sleeves 235/250.

Figure 8:
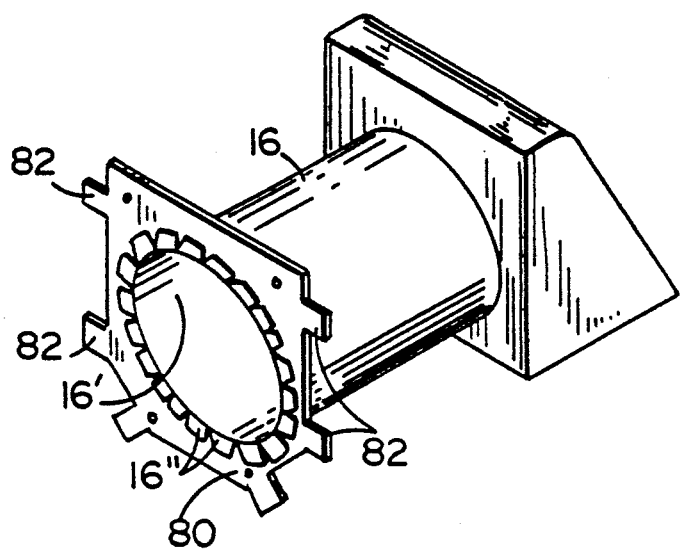
FIG. 8 is a perspective view of a vent hood and tail pipe showing one type of connection using a connector plate.

In the opposite end of metal duct 20 is another sleeve, here shown to be a male sleeve 250, the outer end of which is crimped to reduce its overall diameter. The opposite end of sleeve 250 extends inside of duct 20, with the duct being clamped therearound by conventional clamp 160'. Between the crimped end and the clamped end of this sleeve is a set of outwardly extending protrusions 250' like those previously described at 150', for interengagement with the female sleeve 134 of lower connector 130. Basically, the lower connector 130 is like upper connector 130, having a female sleeve 134 on one end and a male sleeve 150 on the other end, the body thereof being hollow to allow free flow of air between the inlet and outlet sleeves. Male sleeve 150 includes lateral protrusions 150'. This male member fits within a conventional outlet conduit 16 at wall 18. Lower connector 130 may be secured to the wall directly with screws through flange 150a, after trimming conduit 16 to be flush with the wall. Alternatively, it may be held by cutting tabs 16" into stub conduit 16 (FIG. 8) and bending them over the outer surface of plate 80 to secure plate 80 against the wall. Then tabs 82 are bent around the periphery of flange 150a after inserting collar 150 of lower connector 130 into conduit 16.

Another alternative is to cut conduit 16 flush with the wall surface, attach plate 80 over the opening of conduit 16 by securing it to the wall with conventional screws, and bending tabs 82 around the periphery of flange 150a after inserting collar 150 of lower connectors 130 into conduit 16.

Another alternative is to cut a longitudinal slit into conduit 16, place collar 150 of connector 130 into conduit 16, and then use a band clamp 160 to compress conduit 16 around collar 15.

Figure 5:
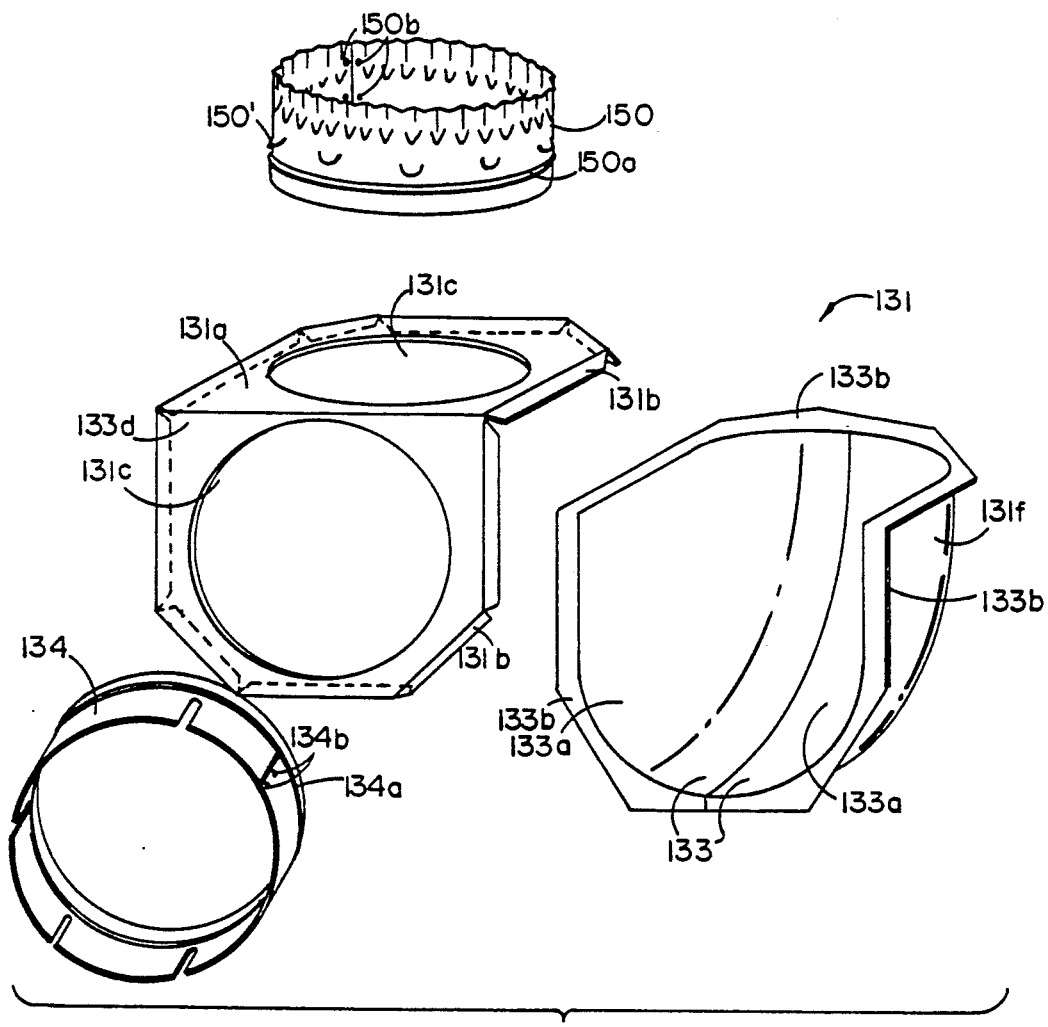
FIG. 5 is an exploded view of the elbow connector and a portion of duct.

Each of the elbow connectors 130 is formed of a thin metal, preferably aluminum, including a body and the two previously described male and female sleeves. The body 131 is formed from two members. More specifically, referring to FIG. 5, there is shown one member, an L-shaped plate 131a, having two planar legs generally normal to each other and integrally interconnected at the bight, and having a series of bendable elongated flanges 131b around the periphery of the L-shaped plate. In each leg of the L-plate is die cut a circular opening 131c. These two openings receive the respective sleeves 150 and 134. This L-plate may be formed by the steps of die cutting openings 131c into the flat plate, die forming and optionally bending flanges 131b to a position normal to the legs of the plate, and then bending the plate along bight line 131d to form the two orificed planar legs.

Figure 3:
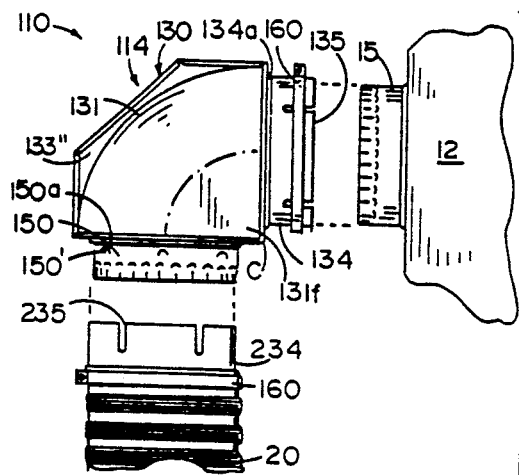
FIG. 3 is an end elevational view of the lower portion of the assembly in FIG. 1.
Figure 3:
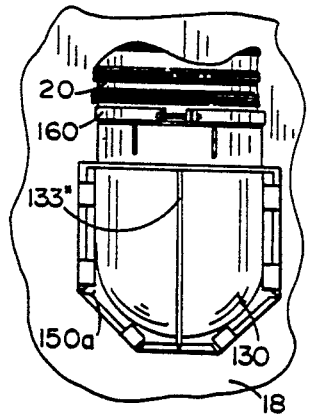

Interfitting with L-plate 131a is another member 133 the outer 180 degree part of which is a quarter-toroid. Extending integrally from this outer part to the L-plate is a pair of parallel, generally flat quadrants 131f. This outer half portion of a quarter-toroid is a hollow shell preferably made up of one piece from mirror image half components. This member 133, and specifically mirror image half components 133a, has peripheral flanges 133b in two planes normal to each other and to the quadrants 131f, to interfit with the flanges of L-plate 131a. Each also has an outwardly projecting peripheral flange, 133' (FIG. 2) and 133" (FIGS. 1 and 3), which engage each other and are secured together. Hence, when the outer portion is superimposed over the L-plate, the flanges of the L-plate can be bent over the flanges of the quarter toroid portion to secure them together and thereby form a smooth duct open only through orifices 131c.

Figure 6:
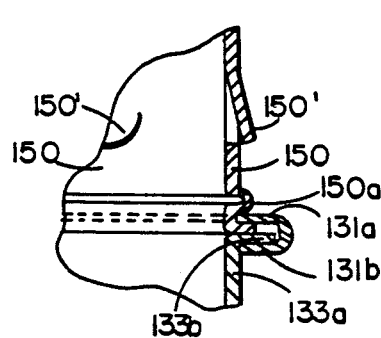
FIG. 6 is an enlarged, fragmentary view of a portion of the joint in the elbow connector.

Sleeves 134 and 150 are inserted and connected into these orifices. More specifically, each of these sleeve members is normally formed of a disconnected ring having a shoulder toward one axial end, i.e., shoulder 150a in sleeve 150, and shoulder 134a in sleeve 134. Male sleeve 150 also is crimped at the opposite axial end, and stamped to form angular protrusion tabs 150'. One end of the ring is then inserted into an orifice 131c until shoulder 150a (or 134a) abuts the leg of the L-plate. Then the inwardly extending portion of the ring is radially outwardly deformed 90° to be flattened on the inner side of the L-plate, radially-outwardly extending annular shoulder 150a or 134a is flattened on the outside of the L-plate, and a pair of rivets 150b or 134b are inserted to secure the overlapping ends of the respective sleeve rings. This arrangement is depicted in FIG. 6 for sleeve 150.

In assembly of this apparatus, the male end 150 of one of the elbow connectors 130 may be inserted into the outlet 16 in the wall 18, and attached to one end of metal expandable duct 20 by inserting the male sleeve 250 into the female sleeve 134, the projections 250' catching behind the flange of the female sleeve 134 to hold the two in interfitted relationship, thus axially securing the two together. This sleeve 250 has its other end within the end of flexible duct 20 retained by clamp 160'. The other end of duct 20 has one end of a female sleeve 234 inserted therewithin and secured by clamp 160'. The male end 150 of the other connector 130 is inserted into the female sleeve 234, with protrusions 150' catching behind the flange 234b (FIG. 7) to retain the two in interconnected relationship. The female end 134 of connector 130 is thus ready to be connected to the outlet of dryer 12. The unit can stand vertically, if desired, from a lower wall outlet to an upper dryer outlet, or from an upper wall outlet to a lower dryer outlet. The unit can also extend laterally along a wall. Each cylindrical end of each connector 130 is capable of swiveling rotation about its axis, to enable the unit to adapt to various circumstances and arrangements. The duct is torsionally rigid. The swivel prevents kinking of the duct and permits the dryer to be moved without disassembly of the duct assembly, yet without twisting the fittings and causing stress that could damage the elbows or attaching hardware. Ultimately, the dryer is positioned adjacent the wall and the last connection made simply by the installer reaching over the dryer, sliding the last female and male connectors together to an interlocked condition. The assembly is ultimately displaceable without disassembly thereof.

Manufacture of the apparatus is straightforward and can be automated. The unit can be readily installed by one of little skill, and, in fact, no skill in the metal working field, to produce a safe arrangement.

Conceivably, various details of this invention, as illustrated in the preferred embodiment, may be modified to suit a particular type of installation. Hence, the invention is not intended to be limited to the specific embodiment set forth as illustrative, but only by the scope of the appended claims and the reasonably equivalent structures to those defined therein.

The embodiments of the invention in which an exclusive property or privilege is claimed are defined as follows:

1. An air flow duct assembly comprising:
   a flexible, metal, corrugated conduit having first and second ends;
   said flexible conduit being axially extendible and contractible, and laterally flexible;
   a pair of elbow connectors on said ends;
   each elbow connector having a body and a pair of openings, and first and second cylindrical, flow-through, swivel sleeves in said openings, each sleeve being rotational on said body about its cylindrical axis;
   said body having a radially outer portion which is like the outer portion of a quarter-toroid, having an L-shaped plate forming a pair of legs, each of which legs has one of said openings therethrough, and having an outer curvilinear surface semicircular in cross section and extending between said legs; and
   each of said sleeves being male or female, one of said sleeves in each elbow connector telescopically interfitting with said flexible conduit.

2. The assembly in claim 1 wherein said conduit includes male or female members at its ends, interfitting with said female or male sleeves, respectively, on said elbow connectors.

3. The assembly in claim 1 wherein said swivel sleeves and said body have radially interfitting peripheral recesses and projections.

4. An air flow duct assembly comprising:
   a flexible conduit having first and second ends;
   a pair of elbow connectors on said ends;
   each elbow connector having a body and a pair of openings, and first and second cylindrical, flow-through, swivel sleeves in said openings, each sleeve being rotational on said body about its cylindrical axis;
   each of said sleeves being male or female, telescopically interfitting with said flexible conduit;
   said body having a radially outer portion which is like the outer portion of a quarter-toroid; and
   wherein said quarter-toroid portion is formed of two joined, mirror image, arcuate, metal elements and an L-shaped plate secured to said elements, the legs of said plate each having one of said openings.

5. The assembly in claim 4 wherein said elements and said plate have interconnected flanges to secure them together.

6. The assembly in claim 1 wherein said body has a radially inner portion which has a square elbow type configuration.

* * * * *